United States Patent [19]
Snoberger et al.

[11] 3,891,231
[45] June 24, 1975

[54] TRAVEL TRAILER FRAME AND SUSPENSION

[75] Inventors: Robert C. Snoberger, Goshen; Thomas C. Delker, South Bend; Richard L. Reschly, Goshen, all of Ind.

[73] Assignee: Travel Equipment Corporation, Goshen, Ind.

[22] Filed: Oct. 21, 1974

[21] Appl. No.: 516,351

[52] U.S. Cl. .......................... 280/106.5 R; 267/54
[51] Int. Cl.² ....................................... B60G 11/04
[58] Field of Search ............ 280/106, 106 T, 106.5; 267/54

[56] References Cited
UNITED STATES PATENTS

| | | | |
|---|---|---|---|
| 2,141,650 | 12/1938 | Harmon | 280/106.5 R |
| 3,177,005 | 4/1965 | Duero | 280/106.5 R |
| 3,689,054 | 9/1972 | Gouirand | 280/106.5 R |

*Primary Examiner*—Philip Goodman

[57] ABSTRACT

A trailer support frame includes full length intermain rails of Z–section, the rails having a central section of maximum size and provided with a mounting notch to accommodate a straight axle. The rails taper forwardly and rearwardly of the central section and are connected to opposite ends of leaf spring assemblies to locate the straight axle close to the support surfaces presented by the rail to achieve a low silhouette, mechanical strength, flexibility of use and unrestricted track axle width.

5 Claims, 2 Drawing Figures

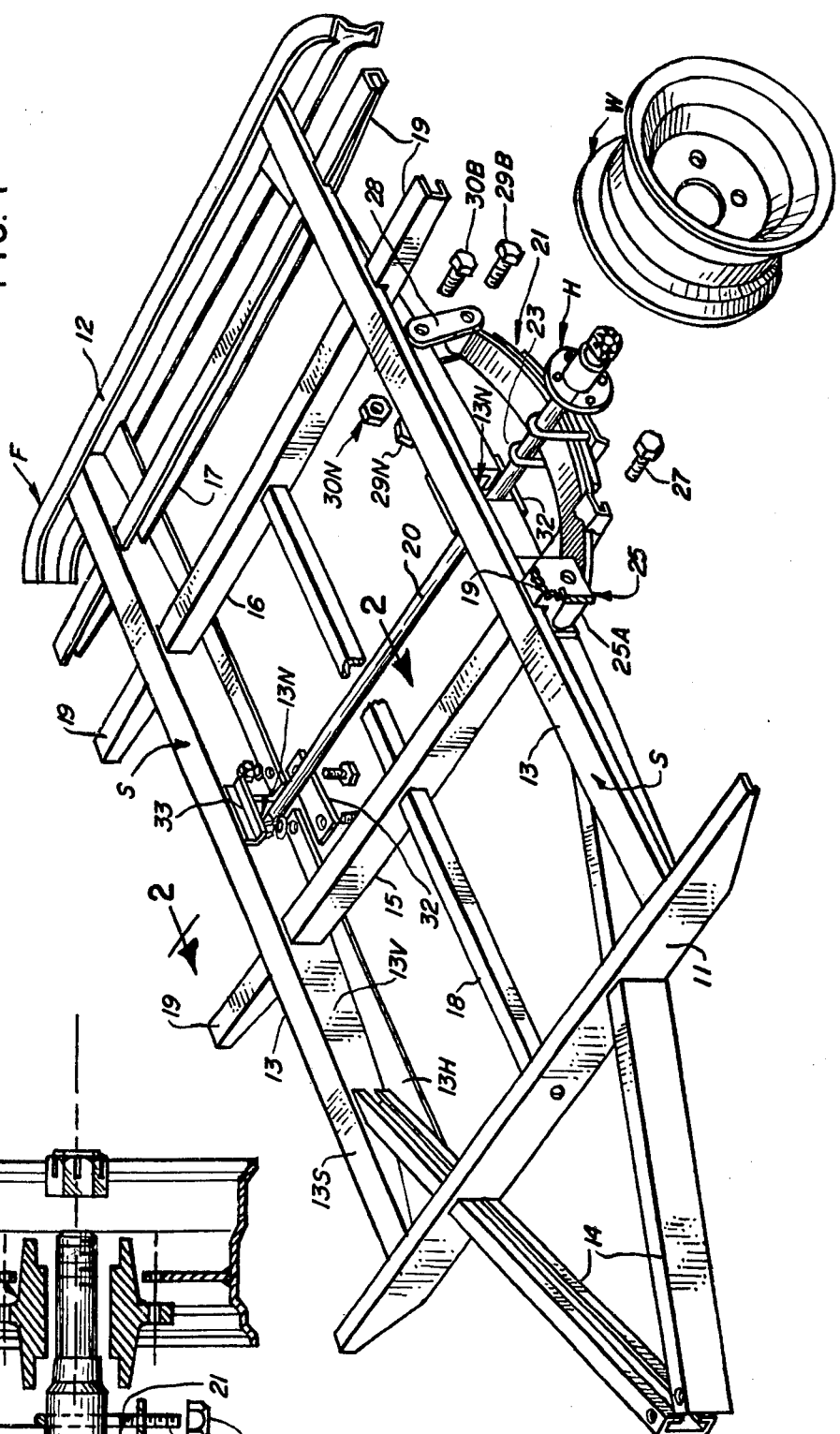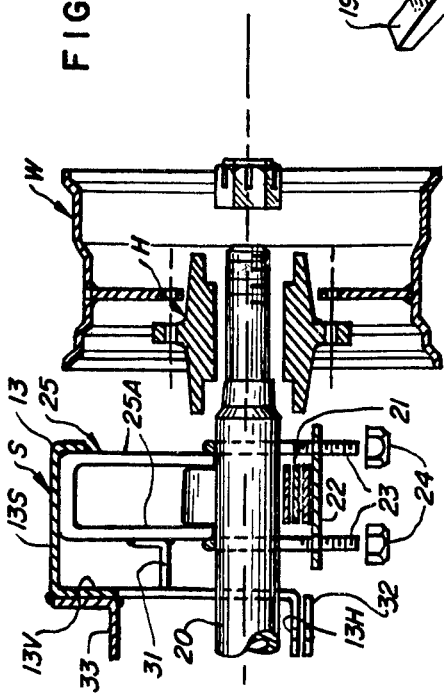

TRAVEL TRAILER FRAME AND SUSPENSION

BACKGROUND OF THE INVENTION

This invention relates to support frames for general application to trailer units such as camping trailers, travel trailers, utility trailers, etc.

Currently, there is a wide difference in the support frame arrangements for different types of trailers. Various advantageous features appear individually in one or more of the different types of existing vehicle support frames but design compromises have resulted in sacrificing certain features in favor of others.

The resultant arrangements are not only deficient in one or more respects but the diversity in design has seriously limited the use of mass production techniques and has resulted in excessive inventory and supply problems.

SUMMARY OF THE INVENTION

The present invention provides an improved support frame and axle suspension arrangement suited for various types of trailer vehicles and combining a number of advantages including:
 a. providing a low silhouette while using an economical straight axle system;
 b. providing increased longitudinal frame stiffness, increased strength to weight ratio, and unrestricted axle track width by the use of substantially full length inter main rails; and
 c. providing a frame affording greater flexibility in being adapted for use with various types of trailer vehicles.

More particularly, the invention provides a multipurpose support frame and axle suspension assembly for trailer type vehicles and comprising a pair of trusslike horizontal main rails, providing planar box support surfaces, each rail tapering vertically forwardly and rearwardly of an intermediate axle mounting section thereof; each intermediate mounting section having a downwardly opening mounting notch; a straight axle extending between and projecting beyond the main rails; a leaf spring assembly for supporting each rail from a corresponding end of the axle; and mounting means for connecting each leaf spring assembly to the corresponding rail to position the axle ends within the mounting notches for accommodating relative vertical travel therebetween.

The main rails are shown as being of a Z-shaped section and as substantially full length inter-main rails to avoid restriction of the axle track width and allow more versatile application of the frame to various types of vehicles.

Reenforcements are applied to the main rails at the mounting notches to compensate for the notch cutouts and to hold the axle captive.

The mounting means for the axle and leaf spring assemblies include rear hanger means for connecting the rear of the corresponding leaf spring assembly to a point adjacent the rail support surface and front hanger means for connecting the front of the assembly to a point intermediate of the height of the main rail.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF DRAWINGS

In the accompanying drawings forming a part of the specification, and in which like numerals are employed to designate like parts throughout the same:

FIG. 1 is an exploded perspective view showing a vehicle support frame and axle suspension arrangement in accordance with the invention; and FIG. 2 is an enlarged section taken as indicated on the line 2—2 of FIG. 1.

DESCRIPTION OF PREFERRED EMBODIMENT

Referring now to the drawings and particularly to FIG. 1, a support frame and axle suspension assembly suitable for use with various types of trailer vehicles is illustrated in an exploded perspective view to better disclose the details of the construction. In the illustrated embodiment the frame F has a front cross member 11 and a rear bumper 12 connected to opposite ends of a pair of substantially full length inter-main rails 13. A pair of channels 14 defines a V-shaped draw bar, each channel projecting through the front cross member 11 and having a mitered rear end secured to the corresponding inter-main rail 13. A set of channel-shaped center members 15, 16 and 17 extend between and terminate in abutment with intermediate portions of the inter-main rails and an angle member 18 extends from the front cross member 11 through the center member 15 to be anchored to the center member 16 and serve as a center rib. Pairs of tapered outriggers 19 are secured to the outboard regions of the inter-main rails 13 in endwise alignment with each of the center members 15, 16 and 17.

Each of the inter-main rails is provided with a transversely aligned downwardly opening mounting notch 13N to accommodate a straight axle 20 that projects through and beyond the main rails to be located at an elevation only a few inches below the planar support surfaces S defined by the tops of the main rails so that a trailer box (not shown) is carried by the main rails at a low center of gravity relative to the straight axle. The axle 20 receives a plain hub assembly H and a wheel W at each end.

Many of the advantages of the present support frame arrangement result from the use of substantially full length inter-main rails of unique configuration. As is best seen in FIG. 2 the inter-main rail 13 has a generally Z-shaped cross-section, providing a horizontal outboard flange 13S which terminates in a depending stiffener flange, a main vertical flange 13V which carries the outboard flange and which terminates at its lower end in a horizontal inboard flange 13H. The main rails are seen to be of a truss-like configuration in that the vertical flange 13V is of maximum height at its center region, where the axle connections are made and tapers to a smaller dimension both forwardly and rearwardly of the center section. The horizontal inboard flange 13H is seen to be of maximum width at the ends and tapers toward the center region where the mounting notch 13N for the axle is located.

Each end of the axle is provided with a leaf spring unit 21 which is shown connected to the axle by a conventional tie plate 22 and pairs of U-bolts 23 and lock nuts 24.

Each main rail is provided with a front hanger 25 and a rear hanger 26 to support the corresponding ends of the leaf spring unit 21. A front hanger bolt 27 secures the front end of the leaf spring unit between the depending legs 25A of the front hanger and a shackle link 28 has its lower ends connected to the rear of the leaf spring unit by a shackle bolt 29B and lock nut 29N and has its upper end connected to the rear hanger 26 by a shackle bolt 30B and lock nut 30N.

As best seen in FIG. 2 the front hanger 25 is in the form of an inverted U-shaped element secured to and underhanging an outboard flange 13S that defines the top surface S of the main rail. The front hanger 25 is of less width than the flange and is stabilized by an angle iron spacer 31 which is shown as having a vertical leg secured by weld to the inboard leg 25L of the front hanger and a horizontal leg secured by weld to the vertical flange 13V of the main rail. It will be noted that the center line of the front hanger bolt 27 that secures the leaf spring to the front hanger is about half way up the vertical flange 13V and the points of attachment of the front hanger to the main rail are near its upper surface. Correspondingly, the rear hanger is shown to receive the upper shackle link bolt 30B near the upper surface of the main rail.

These connections and mounting arrangements for the leaf spring unit enable the axle 20 to assume a neutral position about midheight of the mounting notches 13N of the main rails so that vertical travel of the axle above and below this neutral position can be accommodated. Thus, the axle location is made proximate to the top box supporting surface of the main rails, thereby allowing the box to ride at a minimum elevation above the road. An important advantage of this arrangement is that it makes it possible to provide trailers having a low silhouette while using an economical straight axle design.

In the preferred embodiment disclosed herein, a separate support strap 32 connected to each inter-main rail across the lower region of its mounting notch provides a captive axle mounting arrangement capable of retaining the axle in the event a leaf spring should break.

Among the primary advantages of the disclosed tapered inter-main rail configuration, in addition to accomplishing a low silhouette with a straight axle is that it increases longitudinal frame stiffness and offers a maximum strength to weight ratio. To compensate for the mounting notch cutout, the flange strap 32 is supplemented by a reenforcement angle 33 mounted on the inboard face of the vertical flange to bridge across the top regions of the mounting notches. The disclosed inter-main rail arrangement avoids restrictions in the axle track width and enables greater flexibility of use in that a single support frame arrangement can accommodate various types of trailers.

Thus, while preferred constructional features of the invention are embodied in the structure illustrated herein, it is to be understood that changes and variations may be made by those skilled in the art without departing from the spirit and scope of the appended claims.

What is claimed is:

1. A multi-purpose support frame and axle suspension assembly for trailer type vehicles and comprising a pair of truss-like horizontal main rails, providing planar box support surfaces, each rail tapering vertically forwardly and rearwardly of an intermediate axle mounting section thereof; each intermediate mounting section having a downwardly opening mounting notch; a straight axle extending between and projecting beyond the main rails; a leaf spring assembly for supporting each rail from a corresponding end of the axle; and mounting means for connecting each leaf spring assembly to the corresponding rail to position the axle ends within the mounting notches for accommodating relative vertical travel therebetween.

2. An arrangement as defined in claim 1 wherein the main rails are substantially full length inter-main rails that provide outboard clearance for accommodating a range of axle track width.

3. An arrangement as defined in claim 1 and including reenforcement means secured across the mounting notch of each main rail to hold the axle captive.

4. An arrangement as defined in claim 1 wherein the mounting means includes rear hanger means for connecting the rear of the corresponding leaf spring assembly to a point adjacent the rail support surface and front hanger means for connecting the front of the assembly to a point intermediate of the height of the main rail.

5. An arrangement as defined in claim 1 wherein the main rails are substantially full length inter-main rails of generally Z-shape section to provide an outboard top flange, a vertical flange and an inboard bottom flange, each mounting notch being a cut out of the vertical flange and the bottom flange, reenforcement means secured across the cut out of the bottom flange of each main rail to hold the axle captive.

* * * * *